US009204491B2

(12) United States Patent
Drevon et al.

(10) Patent No.: US 9,204,491 B2
(45) Date of Patent: Dec. 1, 2015

(54) METHOD OF MANAGING QUALITY OF SERVICE IN A MOBILE RADIO SYSTEM

(75) Inventors: Nicolas Drevon, Paris (FR); Anne Gabriel, Paris (FR); Pascal Treillard, Palaiseau (FR)

(73) Assignee: Alcatel Lucent, Boulogne-Billancourt (FR)

( * ) Notice: Subject to any disclaimer, the term of this patent is extended or adjusted under 35 U.S.C. 154(b) by 995 days.

(21) Appl. No.: 10/766,843

(22) Filed: Jan. 30, 2004

(65) Prior Publication Data

US 2004/0252699 A1    Dec. 16, 2004

(30) Foreign Application Priority Data

Jan. 31, 2003 (FR) ...................................... 03 01103

(51) Int. Cl.
*H04L 12/28* (2006.01)
*H04W 92/12* (2009.01)
*H04W 28/26* (2009.01)

(52) U.S. Cl.
CPC .............. *H04W 92/12* (2013.01); *H04W 28/26* (2013.01)

(58) Field of Classification Search
USPC ........ 370/229, 230, 231, 395.1, 395.5, 310.1, 370/310.2, 466, 395.2, 467; 455/450, 451, 455/452.1, 452.2, 509, 522, 418
See application file for complete search history.

(56) References Cited

U.S. PATENT DOCUMENTS

| | | | |
|---|---|---|---|
| 6,374,112 B1 * | 4/2002 | Widegren et al. ........... 455/452.2 |
| 6,795,689 B1 * | 9/2004 | Ogren et al. ................ 455/67.13 |
| 6,889,050 B1 * | 5/2005 | Willars et al. .............. 455/452.2 |
| 2001/0036823 A1 * | 11/2001 | Van Lieshout et al. ....... 455/418 |
| 2002/0061764 A1 * | 5/2002 | Kim et al. ..................... 455/522 |
| 2002/0082020 A1 * | 6/2002 | Lee et al. ...................... 455/450 |
| 2002/0093925 A1 | 7/2002 | Chuah ........................... 370/332 |
| 2003/0099241 A1 * | 5/2003 | Kekki et al. ................. 370/395.2 |
| 2003/0156580 A1 * | 8/2003 | Abraham et al. ............. 370/389 |
| 2003/0161325 A1 * | 8/2003 | Kekki ....................... 370/395.43 |
| 2003/0202490 A1 * | 10/2003 | Gunnarsson et al. ......... 370/332 |
| 2003/0203736 A1 * | 10/2003 | Chi et al. ...................... 455/450 |
| 2004/0110521 A1 * | 6/2004 | Soldani et al. ................ 455/509 |
| 2004/0198369 A1 * | 10/2004 | Kwak et al. ................ 455/452.2 |
| 2004/0203640 A1 * | 10/2004 | Molander et al. .......... 455/414.1 |
| 2005/0130690 A1 * | 6/2005 | Shinozaki ..................... 455/522 |
| 2005/0210154 A1 * | 9/2005 | Verma et al. .................. 709/249 |

FOREIGN PATENT DOCUMENTS

WO        WO 01/86974 A2    11/2001

OTHER PUBLICATIONS

3GPP: "Universal Mobile Telecommunication System (UMTS) Quality of Service (QoS) concept and architecture (3GPP TS 23.107 version 5.7.0 Release 5)".
Traffic transfer delay signalling, 3GPP TSG-RAN Working Group 3 Meeting #22, R3-012069, Jul. 2-6, 2001, France.

\* cited by examiner

*Primary Examiner* — Sulaiman Nooristany
(74) *Attorney, Agent, or Firm* — Chiesa Shahinian & Giantomasi PC

(57) ABSTRACT

One aspect of the present invention is a method of managing quality of service in a mobile radio network in which protocols for communication over terrestrial interfaces comprise a radio network layer and a transport network layer and wherein quality of service management includes quality of service management linked to the radio network layer and quality of service management linked to the transport network layer, said method comprising:
  a step in which a first network element signals to a second network element by means of the radio network layer signaling protocol at least one parameter representative of transport quality of service or of quality of service for the transport network layer, and
  a step in which the second network element uses said at least one parameter for transport quality of service management.

20 Claims, 1 Drawing Sheet

FIG_1
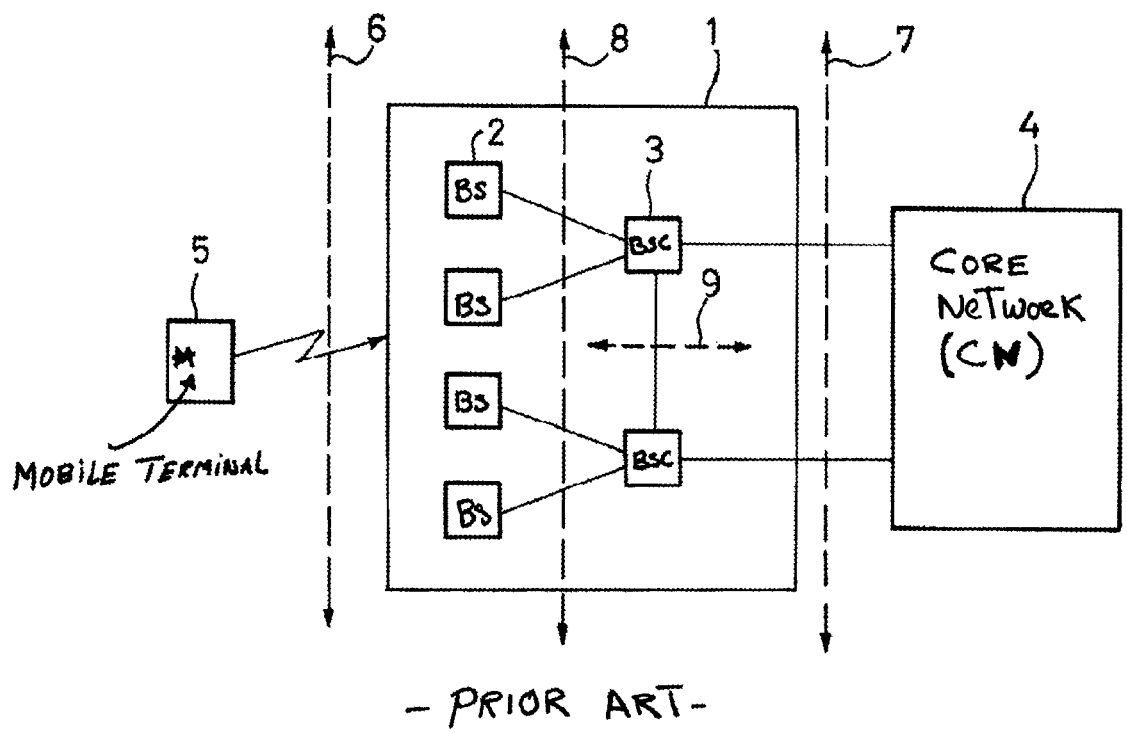
- PRIOR ART -
FIG_3
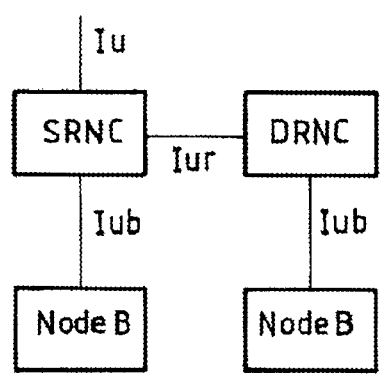
-Related Art-
FIG_2
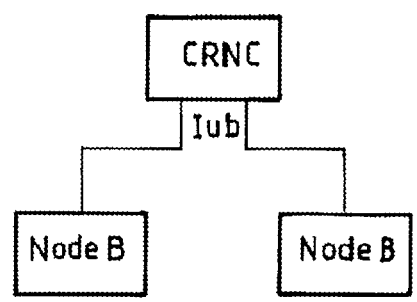
-Related Art-

METHOD OF MANAGING QUALITY OF SERVICE IN A MOBILE RADIO SYSTEM

FIELD OF THE INVENTION

The present invention relates generally to mobile radio systems.

BACKGROUND

The present invention is applicable to third generation mobile radio systems, for example, and in particular to mobile radio systems of the Universal Mobile Telecommunications System (UMTS) type.

Mobile radio systems are generally covered by standards and the corresponding standards published by the corresponding standards bodies may be consulted for more information.

FIG. 1 outlines the general architecture of mobile radio systems, essentially comprising:
  a radio access network (RAN) 1, and
  a core network (CN) 4.

The radio access network comprises network elements such as base stations 2 (BS) and base station controllers 3 (BSC) and communicates with mobile terminals 5 via an interface 6 and with the core network 4 via an interface 7. The core network 4 communicates with external networks (not specifically shown). Within the radio access network, the base stations communicate with the base station controllers via an interface 8.

In a UMTS type system, the radio access network is called the UMTS terrestrial radio access network (UTRAN), a base station is called a Node B, a base station controller is called a radio network controller (RNC), and a mobile terminal is called a user equipment (UE). The interface 6 is called the Uu interface, the interface 7 is called the Iu interface, the interface 8 is called the Iub interface, and an interface 9 between radio network controllers is called the Iur interface. The interface 6 is also called the radio interface and the interfaces 7, 8 and 9 are also called terrestrial interfaces.

The radio network controller that controls a given Node B is called the controlling radio network controller (CRNC) and has a load control and radio resource allocation role for each Node B that it controls. Thus FIG. 2 shows a CRNC controlling a set of Nodes B and the cells (not specifically shown) that are covered by those Nodes B.

For a given call relating to a given user equipment, there is a serving radio network controller (SRNC) having a control role for the call concerned. A Node B connected to the user equipment but not controlled by the SRNC communicates with the SRNC via the radio network controller that controls it, also known as the drift RNC (DRNC), via the Iur interface. This situation arises in macrodiversity transmission, also known as soft handover, for example (although not exclusively). Thus FIG. 3 shows an SRNC controlling a user equipment and communicating with the core network via the interface Iu, and a DRNC controlling the user equipment for radio links set up for cells controlled by that DRNC (these cells are not specifically shown).

The above systems must generally be able to support traffic whose quality of service (QoS) requirements may differ greatly. The quality of service architecture in a system such as the UMTS, for example, is defined in the Technical Specification 3GPP TS 23.107 published by the 3$^{rd}$ Generation Partnership Project (3GPP). This quality of service architecture is based on support services characterized by quality of service attributes. There are various support services, for example radio access bearer (RAB) services, radio bearer (RB) services and Iu bearer services. There are various quality of service attributes, for example traffic class, maximum bit rate, guaranteed bit rate, transfer delay, traffic handling priority, etc. There are four traffic classes, namely conversational application, streaming application, interactive application and background application traffic classes. The quality of service attributes other than the traffic class may also be different for different types of service in the same traffic class; for example, for the conversational traffic class, the transfer delay for a telephone service is less than the transfer delay for a videophone service, which in turn is less than the transfer delay for a web browsing service, for example, for the interactive traffic class, for example. The transfer delay is generally specified only for the conversational and streaming traffic classes and the traffic handling priority is generally specified only for the interactive traffic class.

A model has been defined for the terrestrial interface communications protocols in which a distinction is drawn between a radio network layer corresponding to functions related to radio access, which are independent of the technology used for transport over the terrestrial interfaces, and a transport network layer corresponding to functions related to transport, which depend on the technology used for transport over the terrestrial interfaces. As a general rule, two types of data may be communicated using these protocols, namely data corresponding to traffic sent or received by a user equipment (also known as user data), and data corresponding to signaling, necessary for the operation of the system. There are two types of signaling, namely signaling related to the radio network layer and signaling related to the transport network layer.

The signaling relating to the radio network layer corresponds to the following protocols, for example, which are also known as application protocols:
  for the Iu interface, the Radio Network Application Part (RANAP) protocol, defined for example in the Technical Specification 3GPP TS 25.413 published by the 3GPP,
  for the Iub interface, the Node B Application Part (NBAP) protocol, defined for example in the Technical Specification 3GPP TS 25.433 published by the 3GPP, and
  for the Iur interface, the Radio Network Subsystem Application Part (RNSAP) protocol, defined for example in the Technical Specification 3GPP TS 25.423 published by the 3GPP.

The RANAP protocol includes signaling relating to radio access bearer (RAB) set-up. The NBAP protocol includes signaling relating to radio link set-up for cells controlled by the SRNC. The RNSAP protocol includes signaling relating to radio link set-up for cells controlled by the DRNC.

Quality of service management in the above kind of system generally comprises quality of service management linked to radio access, which is independent of the technology used for transport over the terrestrial interfaces, and quality of service management linked to transport, which depends on the technology used for transport over the terrestrial interfaces.

Quality of service management linked to radio access is typical of code division multiple access (CDMA) systems, for example the UMTS, and includes mechanisms such as radio admission control, selection of appropriate transport formats on transport channels, etc. The exchanges of signaling defined in the application protocols outlined hereinabove generally enable the network elements concerned of the UTRAN to determine the quality of service constraints necessary for executing these quality of service management mechanisms linked to radio access. The main network element of the UTRAN affected by implementing quality of service management mechanisms linked to radio access is the RNC, in its SRNC role. This is because, on the basis of quality of service parameters that are signaled to it by the core network, using the RANAP protocol, the SRNC can decide which type of service is required and therefore translate the quality of service parameters into parameters that may be used to set up radio links between Nodes B and user equipments, if necessary via one or more DRNC, and then signal those parameters to the network elements concerned, namely the Node B, using the NBAP protocol, and the DRNC, using the RNSAP protocol.

Transport over the terrestrial interfaces is generally in packet mode to optimize the use of resources available for transmission over those interfaces. Packet mode was originally intended for non-real-time services (having no strict priority and/or time delay constraints), and additional mechanisms, including quality of service management mechanisms, for example, were introduced subsequently to enable packet mode additionally to support real-time services (having strict priority and/or time delay constrains), for example voice services. In the case of the UMTS for example, it is also necessary to introduce the real-time concept for packet services to deal with the "soft handover" problem, i.e. that of requiring the RNC to supply the sending times of the data to the various Nodes B controlling the cells to which the mobile is connected. These sending times take the form of radio frame numbers, and thus limit the maximum delay authorized for the transmission of data between the RNC and the Node B. For reasons of efficient power control and radio admission control, for example, the maximum delay cannot be set too high.

One transport technology used in the UTRAN is the asynchronous transfer mode (ATM) technology based on asynchronous time division multiplexing of small packets of fixed size known as cells. The ATM technology is covered by standards and the corresponding standards published by the corresponding standards bodies may be consulted for more information. Suffice to say that an ATM network may be modeled by means of an ATM layer and an ATM adaptation layer (AAL) between the ATM layer and users. The ATM layer is connection-oriented and transmits cells between a source and a destination over a logical connection also known as a virtual channel (VC). For application of the ATM technology to transport within the UTRAN, a specific AAL layer called the AAL2 layer is used for user data. When a user equipment communicates with the UTRAN, a corresponding logical connection (called an AAL2 connection) is set up over one or more of the terrestrial interfaces concerned of the UTRAN. In the case of the ATM technology, the mechanisms for managing the transport quality of service include, for example, connection admission control (to decide if the transmission resources are sufficient to accept a new AAL2 connection request whilst maintaining the guaranteed quality of service), and scheduling (queuing) for multiplexing AAL2 connections within a virtual circuit, for example as a function of priority.

Technologies other than the ATM technology may be used in the transport network, for example the Internet Protocol (IP) technology. The IP technology is also covered by standards and the corresponding standards published by the corresponding standards bodies may be consulted for more information. Once again, mechanisms for managing the transport quality of service may be provided in the case of the IP technology.

The present invention relates more particularly to managing the quality of service linked to transport, and even more particularly to mechanisms enabling the network elements concerned of the UTRAN to determine the quality of service constraints necessary for implementing quality of service management. In the absence of such knowledge, or in the event of insufficient knowledge, this quality of service management cannot be implemented optimally and the quality of service may be degraded to an extent that users find unacceptable.

On the basis of radio access bearer (RAB) parameters signaled to it by the core network using the RANAP protocol, the SRNC can decide what type of service is required for a user equipment and therefore which quality of service should be used in the transport network to transmit user data for that user equipment in the downlink direction over the Iub interface to the Node B (respectively over the Iur interface to the DRNC).

A problem nevertheless remains, that of the Node B (respectively the DRNC) knowing which quality of service should be used in the transport network to transmit user data for a user equipment in the uplink direction over the Iub interface (respectively in the uplink direction over the Iur interface and/or the downlink direction over the Iub interface).

A first solution to this problem is as follows. In the case of a transport network using the ATM technology, the signaling relating to the transport network layer includes the Access Link Control Application Part (ALCAP) protocol as defined in ITU T Specifications Q.2630 1 and Q.2630 2 published by the International Telecommunications Union (ITU), for example, and corresponding to successive versions of the 3GPP standard, respectively version R99 (for the ITU-T specification Q.2630 1) and the versions R4 and subsequently R5 (for the ITU-T specification Q.2630-2). The ITU T specification Q.2630 2 defines a quality of service parameter called the AAL type 2 requested type path that may take one of the following three values, as a function of the type of service: "stringent", "tolerant" and "stringent bi level". This parameter is transmitted by the CRNC (respectively the SRNC) to the Node B (respectively the DRNC) and enables the Node B (respectively the DRNC) to determine, within limits defined by these values, the quality of service constraints applicable to uplink transmission of user data over the Iub interface (respectively uplink and downlink transmission over the Iur interface).

However, this first solution may be applied only from version R4 of the 3GPP standard. It is not applicable to the R99 version, or to the R5 version if the transport network uses the IP technology. For example, in the current version of the standard, and in the case of a transport network using the IP technology, the signaling relating to the transport network layer is such that the Node B (respectively the DRNC) does not know which quality of service should be used in the transport network for uplink transmission of user data over the Iub interface (respectively uplink transmission over the Iur interface and/or downlink transmission over the Iub interface). Also, the three values for the AAL type requested type path parameter (see above) do not necessarily differentiate sufficiently between the available types of service, and therefore do not necessarily allow optimum implementation of the quality of service management mechanisms.

A second solution to the above problem is as follows. Under version R99 of the standard, failing a standardized solution, it would be possible to use a "proprietary" mechanism in the Node B (respectively the DRNC) to configure the transport priority for each type of service over the Iub interface (respectively the Iur interface). For example, the Node B (respectively the DRNC) could, on the basis of parameters transmitted by the CRNC (respectively the SRNC) using the ALCAP protocol, determine which connections are associated with voice services and assign them a high transport quality of service, and conversely assign a lower transport quality of service to connections associated with other types of service (for example web browsing, ftp, dedicated signaling, videotelephony, etc.).

However, this second solution may be applied only if the Node B (respectively the DRNC) and the CRNC (respectively the SRNC) are from the same manufacturer. It cannot be applied if those network elements are from different manufacturers.

The present invention adopts another approach to solving this problem. The present invention is based in particular on the following observations. Some quality of service parameters, such as parameters representative of the transfer delay and/or traffic handling priority, as defined for example in the above-mentioned Technical Specification 3GPP TS 23.107, are very important in guaranteeing the quality of service, for example the transport quality of service, within this kind of network. Now, parameters of this kind are already used for quality of service management linked to radio access. However, under the current version of the standard, and as outlined above, for managing the quality of service linked to radio access, knowledge of these quality of service parameters remains essentially localized to the SRNC. This is because, as mentioned above, on the basis of radio access bearer (RAB) parameters that are signaled to it by the core network (using the RANAP protocol), the SRNC can determine which type of service is required for a user equipment. The SRNC can then translate those parameters into parameters that may be used to set up radio links between the Node B and the user equipment, if necessary via one or more DRNC, and then signal those parameters to the network elements concerned, namely the Node B, using the NBAP protocol, and the DRNC, using the RNSAP protocol. These parameters include, for setting up radio links between Nodes B and user equipments, parameters such as transport format combination set (TFCS) or transport format parameters, and, if needed for multiplexing by the DRNC on common or shared transport channels, parameters such as traffic class and traffic handling priority.

However, under the current version of the standard, such signaling of transport format parameters generally cannot indicate quality of service constraints for the transport network layer, and such signaling of the traffic class and the traffic handling priority is effected only at the Iur interface (and not at the Iub interface), and only in the case of common or shared transport channels (and not in the case of dedicated channels). Also, this kind of signaling cannot indicate the quality of service constraints for the transport network layer, at least in terms of transfer delay. In particular, in distinguishing between different conversational class services, it does not allow a distinction to be made between services that require a short transfer delay (for example telephone services) and services that may tolerate longer transfer delays (for example videophone services).

SUMMARY OF INVENTION

A particular object of the present invention is to solve some or all of the above-mentioned problems and/or to avoid some or all of the above-mentioned drawbacks. Another object of the present invention is to propose different mechanisms to allow the network elements concerned of the UTRAN to determine the transport quality of service constraints needed to manage the quality of service. A more general object of the present invention is to improve and/or to simplify quality of service management in these systems.

One aspect of the present invention consists in a method of managing quality of service in a mobile radio network in which protocols for communication over terrestrial interfaces comprise a radio network layer and a transport network layer and quality of service management includes quality of service management linked to the radio network layer and quality of service management linked to the transport network layer, said method comprising:
 a step in which a first network element signals to a second network element by means of the radio network layer signaling protocol at least one parameter representative of transport quality of service or of quality of service for the transport network layer, and
 a step in which the second network element uses said at least one parameter for transport quality of service management.

According to another feature, said first network element is a controlling radio network controller.

According to another feature, said second network element is a Node B or a base station.

According to another feature, said radio network layer signaling protocol is a Node B Application Part protocol applicable to the Iub interface between the controlling radio network controller and the Node B.

According to another feature, said second network element uses said at least one parameter for transport quality of service management for uplink transmission over the Iub interface between the controlling radio network controller and the Node B.

According to another feature, said first network element is a serving radio network controller.

According to another feature, said second network element is a drift radio network controller.

According to another feature, said radio network layer signaling protocol is a radio network subsystem application part signaling protocol applicable to the Iur interface between the serving radio network controller and the drift radio network controller.

According to another feature, said second network element uses said at least one transport quality of service management parameter for uplink transmission over the Iur interface between the serving radio network controller and the drift radio network controller and/or downlink transmission over the Iub interface between the drift radio network controller and the Node B.

According to another feature, said at least one parameter representative of transport quality of service is a specific parameter intended to indicate a transport quality of service level.

According to another feature, said at least one parameter representative of transport quality of service is at least one radio access bearer parameter that may also be used as a transport quality of service parameter.

According to another feature, said at least one radio access bearer parameter that may also be used as a transport quality of service parameter is the transfer delay.

According to another feature, said at least one radio access bearer parameter that may also be used as a transport quality of service parameter is the traffic handling priority.

According to another feature, said at least one radio access bearer parameter that may also be used as a transport quality of service parameter is the traffic class.

According to another feature, said at least one radio access bearer parameter that may also be used as a transport quality of service parameter is copied or translated from the RANAP protocol to the NBAP protocol, respectively from the RANAP protocol to the RNSAP protocol.

According to another feature, said at least one parameter representative of transport quality of service is at least one parameter that may be associated with a transport quality of service level or at least one radio access bearer parameter that may also be used as a transport quality of service parameter.

According to another feature, said at least one parameter that may be associated with a transport quality of service level or at least one radio access bearer parameter that may also be used as a transport quality of service parameter is a time adjustment parameter, the lowest values of said parameter being assigned to connections having the highest transfer delay and/or traffic handling priority constraints, and the highest values of said parameter being assigned to connections having the highest transfer delay and/or traffic handling priority constraints.

According to another feature, said time adjustment parameter is the time of arrival window start parameter.

According to another feature, said at least one parameter that may be associated with a level of transport quality of service or at least one radio access bearer parameter that may also be used as a transport quality of service parameter includes at least one parameter representative of the number of dedicated channels allocated to a connection, a high number of dedicated channels being allocated to connections having high transfer delay and/or traffic handling priority constraints, and a lower number of dedicated channels being allocated to connections having lower transfer delay and/or traffic handling priority constraints.

The present invention also consists in a network element comprising means for implementing the above method.

According to another feature, said network element is a controlling radio network controller.

According to another feature, said network element is a serving radio network controller.

According to another feature, said network element is a drift radio network controller.

According to another feature, said network element is a Node B.

Other objects and features of the present invention will become apparent on reading the following description of one embodiment, given with reference to the appended drawings, in which:

BRIEF DESCRIPTION OF DRAWINGS

FIG. 1, described above, shows the general architecture of a mobile radio system such as the UMTS for example, and FIGS. 2 and 3, described above, show the CRNC, SRNC, and DRNC roles of an RNC.

DETAILED DESCRIPTION

Different embodiments of the present invention are described hereinafter.

In a first embodiment, one or more new parameters may be introduced into one or more signaling messages sent from the CRNC to the Node B using the NBAP protocol (respectively from the SRNC to the DRNC using the RNSAP protocol). By means of the new parameter(s), the CRNC (respectively the SRNC) is able to assign a high level of transport quality of service to certain types of service (for example types of service having high delay and/or priority constraints) and a lower transport quality of service level to other types of service (for example types of service having less strict delay and/or priority constraints). For example, a high level of transport quality of service may be assigned to voice services and a lower transport quality of service level may be assigned to other types of service. Intermediate quality of service levels may also be provided, in sufficient numbers to allow sufficient differentiation of types of service and thus optimum quality of service management. For example, the new parameter(s) may be transmitted in a message such as the "Radio Link Setup Request" message sent from the CRNC to the Node B using the NBAP protocol (respectively from the SRNC to the DRNC using the RNSAP protocol).

In a second embodiment, one or more new parameters for indicating transport quality of service parameter values for each type of service may be introduced into one or more signaling messages sent from the CRNC to the Node B using the NBAP protocol (respectively from the SRNC to the DRNC using the RNSAP protocol). The new parameter(s) may be derived from the radio access bearer (RAB) parameters sent to the SRNC using the RANAP protocol, for example. The RANAP protocol includes sending the following RAB parameters from the core network to the SRNC:
traffic class,
transfer delay for conversational or streaming class services, and
traffic handling priority for interactive class services.

For example, the new parameter(s) may correspond to one or more traffic class, transfer delay, and traffic handling priority parameters which may then be copied (or translated) from the RANAP protocol to the NBAP protocol, or one or more transfer delay and traffic handling priority parameters, which may then be copied (or translated) from the RANAP protocol to the RNSAP protocol (the traffic class parameter having already been copied from the RANAP protocol to the RNSAP protocol).

For example, the new parameter(s) may be sent in a message such as the "Radio Link Setup Request" message sent from the CRNC to the Node B using the NBAP protocol (respectively from the SRNC to the DRNC using the RNSAP protocol).

In a third embodiment, one or more existing parameters communicated to the Node B (respectively the DRNC) using the NBAP protocol (respectively the RNSAP protocol) may be used by the Node B (respectively the DRNC) to assign a high level of transport quality of service to certain types of service (for example types of service having strict delay and/or priority constraints) and a lower level of transport quality of service to other types of service (for example types of service having less strict delay and/or priority constraints).

A first example of these existing parameters is the time of arrival window start (TOAWS) parameter defined in the Technical Specification 3GPP TS 25.402, for example. Remember that dedicated frame protocols, as defined in the Technical Specifications 3GPP TS 25.425, 3GPP TS 25.427 and 3GPP TS 25.435, for example, are used for the transfer of user data over the terrestrial interfaces. Those protocols provide a data structure in accordance with a frame format and time adjustment and synchronization functions involving the TOAWS parameter, for example. To be more precise, a reception window is defined within which the time of arrival at the Node B of a frame sent by the RNC should occur. This window is defined by a time of arrival window start (TOAWS) defined relative to a time of arrival window end (TOAWE) in turn defined relative to a latest time of arrival (LTOA). If the time of arrival of a frame is before the TOAWS or after the TOAWE, then the Node B requests a time adjustment from the RNC. The object is to ensure that the Node B receives frames within a time appropriate for their retransmission at predetermined times over the radio interface, i.e. soon enough to be able to carry out the necessary processing before such retransmission, but not too soon, to avoid waiting times. A reception window of this kind is configured in the Node B when each radio link is set up; TOAWE and TOAWS values are therefore signaled by the CRNC (respectively the SRNC) to the Node B (respectively the DRNC) in different messages using the NBAP protocol (respectively the RNSAP protocol), such as the "Radio Link Setup Request" message for example.

According to one aspect of the invention, the CRNC (respectively the SRNC) may therefore assign the lowest TOAWS values to connections having a higher level of transport quality of service, for example, and the Node B (respectively the DRNC) may then use those TOAWS values for transport quality of service management. In other words, a time adjustment parameter such as the TOAWS parameter may be considered representative of transport quality of service in that it may be associated with a transport quality of service level or with at least one RAB parameter that may itself be used as a transport quality of service parameter. The CRNC (respectively the SRNC) may for example assign a TOAWS value of 10 ms to connections having a high level of transport quality of service (such as connections for voice services, for example), or a higher TOAWS value to connections having a lower level of transport quality of service, and signal that value to the Node B (respectively the DRNC), for example in the NBAP (respectively the RNSAP) "Radio Link Set Up Request" message. The Node B (respectively the DRNC) then assigns a high level of transport quality of service to connections having the lowest TOAWS values or a lower level of transport quality of service to connections having higher TOAWS values.

A second example of an existing parameter is the number of dedicated channels (DCH) assigned to a connection. As is known in the art, the CRNC (respectively the SRNC) may assign a plurality of dedicated channels to connections having a high level of transport quality of service (such as connections for voice services, for example) or a single dedicated channel to connections for other types of service having a lower level of transport quality of service. For example, for speech using adaptive multi-rate (AMR) coding, three different transport channels are generally used, one for class A bits, one for class B bits and one for class C bits, where the three classes of bits correspond to different levels of importance of the bits. See also, for example, the Technical Specification 3GPP TS 34.108. The CRNC (respectively the SRNC) may then signal the number of dedicated channels to the Node B (respectively the DRNC), for example in the NBAP (respectively the RNSAP) "Radio Link Setup Request" message.

According to one aspect of the invention, the Node B (respectively the DRNC) may then assign a high level of transport quality of service to connections such as connections for voice services assigned three dedicated channels or a lower level of transport quality of service to connections to which only one dedicated channel is assigned, for example. In other words, a parameter such as the number of dedicated channels assigned to a connection may also be considered representative of transport quality of service, in that it may be associated with a level of transport quality of service or at least one RAB parameter that may itself be used as a transport quality of service parameter.

To give another example, the SRNC may:
assign the conversational traffic class and allocate three dedicated channels to connections for voice services,
assign the conversational traffic class and allocate a single dedicated channel to connections for other types of conversational class services (for example videophone services),
assign other traffic classes to other connections, and signal those parameters to the DRNC, for example, in a "Radio Link Setup Request" message, for example. The DRNC may then assign a high level of transport quality of service to conversational class connections to which three dedicated channels have been assigned and lower levels of transport quality of service to other connections.

Common to all the above embodiments is the feature that each time the CRNC (respectively the SRNC) sets up a radio link associated with a type of service having high delay and/or priority constraints, it signals to the Node B (respectively the DRNC), using the NBAP protocol (respectively the RNSAP protocol), the fact that the transport connection associated with that particular radio link has a high level of transport quality of service (for example high delay and/or priority constraints). Conversely, each time that the CRNC (respectively the SRNC) sets up a radio link associated with a type of service having a lower level of transport quality of service (for example lower delay and/or priority constraints), it signals to the Node B (respectively the DRNC) using the NBAP protocol (respectively RNSAP protocol) the fact that the transport connection associated with that particular radio link has a lower level of transport quality of service (for example lower delay and/or priority constraints).

Using this information, the Node B (respectively the DRNC) may then implement transport quality of service management mechanisms in the uplink direction over the Iub interface (respectively the uplink direction over the Iur interface and/or the downlink direction over the Iub interface), to satisfy the transport quality of service constraints indicated by the CRNC (respectively the SRNC), for example delay and/or priority constraints. This enables delay constraints for voice services to be satisfied, for example.

The present invention also consists in a network element (for example a CRNC, a SRNC, a DRNC or a Node B) including means for implementing a method of the invention.

Since the particular implementation of such means do not represent any particular problem for the person skilled in the art, such means need not be described here in greater detail than by describing their function, as described above.

What is claimed is:
1. A method of managing quality of service in a mobile radio network in which protocols for communication over terrestrial interfaces comprise a radio network layer and a transport network layer and wherein quality of service management includes quality of service management linked to a radio network layer and quality of service management linked to the transport network layer, said method comprising:
sending, from a first network element to a second network element, by the radio network layer signaling protocol, at least one parameter representative of transport quality of service or of quality of service for the transport network layer,
managing, by the second network element, the transport quality of service according to said at least one parameter for transport quality of service management for uplink transmission over an Iub interface between a controlling radio network controller and a Node B,
wherein said first network element is a controlling radio network controller, wherein said second network element is a Node B or a base station,
wherein said radio network layer signaling protocol is a Node B Application Part protocol applicable to the Iub interface between the controlling radio network controller and the Node B.

2. A method according to claim 1, wherein said at least one parameter representative of transport quality of service is a specific parameter intended to indicate a transport quality of service level.

3. A method according to claim 1, wherein said at least one parameter representative of transport quality of service is at least one radio access bearer parameter.

4. A method according to claim 3, wherein said at least one radio access bearer parameter is the transfer delay.

5. A method according to claim 3, wherein said at least one radio access bearer parameter is the traffic handling priority.

6. A method according to claim 3, wherein said at least one radio access bearer parameter is the traffic class.

7. A method according to claim 3, wherein said at least one radio access bearer parameter is copied or translated from the RANAP protocol to the NBAP protocol, or from the RANAP protocol to the RNSAP protocol.

8. A method according to claim 1, wherein said at least one parameter representative of transport quality of service is at least one parameter associated with a transport quality of service level or at least one radio access bearer parameter.

9. A method of managing quality of service in a mobile radio network in which protocols for communication over terrestrial interfaces comprise a radio network layer and a transport network layer and wherein quality of service management includes quality of service management linked to a radio network layer and quality of service management linked to the transport network layer, said method comprising:
   sending, from a first network element to a second network element, by the radio network layer signaling protocol, at least one parameter representative of transport quality of service or of quality of service for the transport network layer, and
   managing, by the second network element, the transport quality of service according to said at least one parameter for transport quality of service management for uplink transmission over an Iub interface between a controlling radio network controller and a Node B,
   wherein said at least one parameter representative of transport quality of service is at least one parameter associated with a transport quality of service level or at least one radio access bearer parameter, and
   wherein said at least one parameter associated with a transport quality of service level or at least one radio access bearer parameter is a time adjustment parameter, the lowest values of said parameter being assigned to connections having at least one of higher transfer delay and traffic handling priority constraints and the higher values of said parameter being assigned to connections having at least one of higher transfer delay and traffic handling priority constraints.

10. A method according to claim 9, wherein said time adjustment parameter is the time of arrival window start parameter.

11. A method of managing quality of service in a mobile radio network in which protocols for communication over terrestrial interfaces comprise a radio network layer and a transport network layer and wherein quality of service management includes quality of service management linked to a radio network layer and quality of service management linked to the transport network layer, said method comprising:
   sending, from a first network element to a second network element, by the radio network layer signaling protocol, at least one parameter representative of transport quality of service or of quality of service for the transport network layer, and
   managing, by the second network element, the transport quality of service according to said at least one parameter for transport quality of service management for uplink transmission over an Iub interface between a controlling radio network controller and a Node B,
   wherein said at least one parameter representative of transport quality of service is at least one parameter associated with a transport quality of service level or at least one radio access bearer parameter, and
   wherein said at least one parameter associated with a level of transport quality of service or at least one radio access bearer parameter includes at least one parameter representative of the number of dedicated channels allocated to a connection, a high number of dedicated channels being allocated to connections having high transfer delay and/or traffic handling priority constraints and a lower number of dedicated channels being allocated to connections having lower transfer delay and/or traffic handling priority constraints.

12. A radio network controller CRNC comprising:
   a controller which controls a Node B; and
   a data signaler which signals to the Node B, in accordance with a signalling protocol of a radio network layer corresponding to the NBAP protocol applicable to the Iub interface between the radio network controller CRNC and Node B, at least one parameter representing the quality of service for the transport network layer,
   wherein the quality of service for the transport network layer is managed by the Node B according to said at least one parameter for uplink transmission over the Iub interface between the radio network controller CRNC and the Node B.

13. The radio network controller CRNC according to claim 12, wherein said at least one parameter is signaled to the Node B in a Radio Link Setup Request message.

14. The radio network controller CRNC according to claim 12, wherein said at least one parameter is a specific parameter intended to indicate a transport QoS level.

15. A Node B comprising a receiver which receives, from a radio network controller CRNC in accordance with a signalling protocol of a radio network layer corresponding to the NBAP protocol applicable to the Iub interface between the radio network controller CRNC and the Node B, at least one parameter representing the quality of service for the transport network layer, wherein the Node B manages the quality of service for the transport network layer according to said at least one parameter for transmission in the uplink direction over the Iub interface between the radio network controller CRNC and Node B.

16. The Node B according to claim 15, wherein said at least one parameter is received in a Radio Link Setup Request message.

17. The Node B according to claim 15, wherein said at least one parameter corresponds to a specific parameter intended to indicate a transport QoS level.

18. The Node B according to claim 16, wherein said at least one parameter corresponds to a specific parameter intended to indicate a transport QoS level.

19. A method according to claim 1, further comprising:
managing, by the second network element, the transport quality of service according to said at least one parameter for transport quality of service management for uplink transmission over an Iur interface between a serving radio network controller and a drift radio network controllers.

20. A method according to claim 19, further comprising:
managing, by the second network element, the transport quality of service according to said at least one parameter for transport quality of service management for downlink transmission over an Iub interface between a drift radio network controller and a Node B.

\* \* \* \* \*